US012701084B2

(12) United States Patent
Subramanian

(10) Patent No.: US 12,701,084 B2
(45) Date of Patent: Aug. 4, 2026

(54) METHOD AND SYSTEM FOR ROBUST STREAMING OF DATA

(71) Applicant: Cornami, Inc., Dallas, TX (US)

(72) Inventor: Krishnamurthy Subramanian, Saratoga, CA (US)

( * ) Notice: Subject to any disclaimer, the term of this patent is extended or adjusted under 35 U.S.C. 154(b) by 0 days.

(21) Appl. No.: 18/651,190

(22) Filed: Apr. 30, 2024

(65) Prior Publication Data

US 2024/0283746 A1     Aug. 22, 2024

Related U.S. Application Data

(63) Continuation of application No. 18/061,691, filed on Dec. 5, 2022, now Pat. No. 11,973,692, which is a continuation of application No. 16/825,585, filed on Mar. 20, 2020, now Pat. No. 11,522,804.

(51) Int. Cl.
| | |
|---|---|
| *H04L 47/34* | (2022.01) |
| *H04L 47/32* | (2022.01) |
| *H04L 49/90* | (2022.01) |

(52) U.S. Cl.
CPC .............. *H04L 47/34* (2013.01); *H04L 47/32* (2013.01); *H04L 49/90* (2013.01)

(58) Field of Classification Search
CPC .......... H04L 47/34; H04L 47/32; H04L 49/90
See application file for complete search history.

(56) References Cited

U.S. PATENT DOCUMENTS

| | | | | |
|---|---|---|---|---|
| 11,522,804 | B2 * | 12/2022 | Subramanian | .......... H04L 47/34 |
| 11,973,692 | B2 * | 4/2024 | Subramanian | .......... H04L 47/34 |
| 2007/0297325 | A1 * | 12/2007 | Larsson | ................ H04L 1/1819 |
| | | | | 370/216 |
| 2009/0110399 | A1 * | 4/2009 | Aihara | ................ H04L 41/0681 |
| | | | | 398/66 |
| 2016/0301604 | A1 | 10/2016 | Wang et al. | |
| 2018/0164865 | A1 * | 6/2018 | Venkataraman | .......... G06F 1/32 |
| 2018/0365176 | A1 * | 12/2018 | Finkelstein | ............. H04L 47/34 |
| 2021/0067457 | A1 | 3/2021 | Wang et al. | |
| 2021/0109300 | A1 * | 4/2021 | Wagh | .................. G06F 16/1748 |
| 2023/0120932 | A1 * | 4/2023 | Parr | .......................... B07B 1/14 |

* cited by examiner

*Primary Examiner* — Siming Liu
(74) *Attorney, Agent, or Firm* — Marisa Whitaker

(57) ABSTRACT

A method and system for providing robust streaming of data from a multi-core die is disclosed. The techniques include using a high bandwidth memory (HBM) device as retransmit buffers for large amounts of data to ensure robust communication in relatively high round trip-transmission time (RTT) transmission. Another technique is supporting two or more Ethernet ports between components to both transmit the same data packets on the two ports to insure robustness. Another technique is to use sequence numbers and send data packets from the different ports in a round robin fashion and reorder the packets upon receipt of an external device. Another technique is dynamically adding and removing paths for data packets between devices with multiple ports based on the quality of the path.

20 Claims, 9 Drawing Sheets

METHOD AND SYSTEM FOR ROBUST STREAMING OF DATA

PRIORITY

The present application is a continuation of U.S. patent application Ser. No. 18,061,691 filed Dec. 5, 2022; U.S. patent application Ser. No. 18/061,691 filed Dec. 5, 2022 is a continuation of U.S. patent application Ser. No. 16/825, 585 filed Mar. 20, 2020, all of which are hereby incorporated by reference in their entireties.

TECHNICAL FIELD

The present disclosure relates generally to communication routines for streams of data from multi-core systems. More particularly, aspects of this disclosure relate to techniques to achieve robust stream communication between multi-core components.

BACKGROUND

Computing systems are increasing based on homogeneous cores. Such systems that may be configured to perform different functions. Thus, such cores may be adapted for many different operations and be purposed for various parallel programming tasks. An array of processing cores are typically fabricated on a die. Multiples of such dies may be fabricated on a chip so they may be divided to allocate the needed processing power. The processing performed by such dies thus relies on many cores being employed to divide programming operations. One example of such division may be a streaming model of programming multiple cores that employs different threads that are assigned to different cores. Such use of numerous cores on one die or multiple dies on different chips relies on reliable and rapid exchange of data between the cores.

In order to exchange information, chips having processing cores must rely on interconnections to send high speed data to other chips, devices, or dies on other chips. Such interconnections must be reliable in order to ensure that the necessary data reaches the external device. However, data exchanges often are missing certain parts of the expected data. When such an error occurs, the block of data must be retransmitted to complete the exchange. The more errors that occur, the greater the delay in processing occurs.

Data for the streams are broken up into packets in certain communication protocols such as Ethernet. Such protocols generally rely on a retransmitter buffer memory accessible to a processor to store packets until it is confirmed that such packets are received successfully.

Thus, there is a need for a robust data connection for communication between a die having multiple cores and an external device. There is a further need to use existing high bandwidth memory as a buffer to ensure that retransmission of lost packets may occur. There is a further need for utilizing multiple ports to ensure robust communication between hardware devices incorporating a die with multiple cores and external devices.

SUMMARY

One disclosed example is a die having a plurality of processing cores and a communication media access controller for receiving data from the plurality of processing cores and communicating to an external device. The die includes a memory interface in communication with an external memory device and a controller. The controller divides a data stream from at least one of the processing cores into data packets. The controller assigns a sequence number to each the data packets and stores a copy of each of the data packets in the memory device. The controller sends the data packets to the external device through the communication media access controller. The controller receives a signal indicating that a data packet has not been successfully received by the external device and retransmitting the data packet from the memory device.

A further implementation of the example die is an embodiment where the controller receives a signal indicating that a data packet has been successfully received by the external device and erases the data packet from the memory device. Another implementation is where the controller receives packets of a data stream from the external device where each of the packets having a sequence number. The controller sends a received packet to at least one of the plurality of processing cores when the received packet of the data stream is the next packet according to the sequence number of the received packet. The controller stores the received packet in the memory device when the received packet is not the next packet according to the sequence number of the received packet. The controller sends a retransmission request to the external device. Another implementation is where the memory device is a high bandwidth memory. Another implementation is where the die includes a plurality of ports. Another implementation is where the controller transmits the same packet on at least two of the plurality of ports. Another implementation is where the port is an Ethernet port. Another implementation is where the controller transmits the data packets on all of the plurality of ports. Another implementation is where the controller determines whether each of a plurality of paths for transmitting data packets meets a predetermined quality of transmission. The controller removes at least one path that fails to meet the predetermined quality of transmission and transmits data packets in the other plurality of paths.

Another disclosed example is a device having a plurality of processing cores and a communication media access controller. The communication media access controller receives data from the plurality of processing cores and communicates to an external device via a first port and a second port. A controller is coupled to the communication media access controller. The controller is operable to send a data stream from at least one of plurality of processing cores over the first and second port to an external device. A further implementation of the example device is an embodiment where the die includes the plurality of processing cores and the first and second ports. Another implementation is where the device includes a first die with a subset of the plurality of cores and the first port; and a second die with a subset of the plurality of cores and the second port. Another implementation is where the first die is on a first chip package and the second die is on a second chip package. Another implementation is where the controller transmits the data stream on the first port and also transmits the data stream on the second port. Another implementation is where the controller divides the data stream into data packets; assigns a sequence number to each the data packets; and sends the data packets on the first port and the second port to the external device. Another implementation is where the controller determines whether each of a plurality of paths for transmitting data packets meets a predetermined quality of transmission. The controller removes at least one path that fails to meet the predetermined quality of transmission, and transmits data packets in the other plurality of paths. Another implementation is where the device includes a memory device. The controller divides a data stream from at least one of the processing cores into data packets and assigns a sequence number to each the data packets. The controller stores a copy of each of the data packets in the memory device. The controller sends the data packets to the external device through the communication media access controller. The controller receives a signal indicating that a data packet has not been successfully received by the external device. The controller retransmits the data packet from the memory device. Another implementation is where the controller receives a signal indicating that a data packet has been successfully received by the external device, and erases the data packet from the memory device. Another implementation is where the controller receives packets of a data stream from the external device, and where each of the packets having a sequence number. The controller sends a received packet to at least one of the plurality of processing cores when the received packet of the data stream is the next packet according to the sequence number of the received packet. The controller stores the received packet in the memory device when the received packet is not the next packet according to the sequence number of the received packet, and sends a retransmission request to the external device.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

Figure 1A:
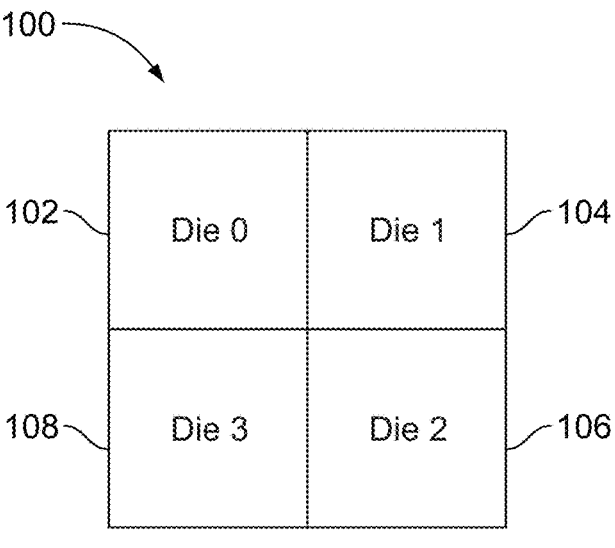
FIG. 1A is a diagram of an example chip having four dies each having multiple processing cores.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements, and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure is directed toward providing robust streaming of data between processing cores on a die and an external device through any one of several techniques. The techniques include using a high bandwidth memory (HBM) device as a retransmit buffer for large amounts of data to ensure robust communication in relatively high round trip-transmission time (RTT) transmission. Another technique is supporting two or more Ethernet ports between components to transmit the same data packets on all ports to insure robustness. Another technique is to use sequence numbers and send data packets from the different ports in a round robin fashion and reorder the packets upon receipt of an external device. For example, the same streams across two Ethernet ports in the same die, the ports from two dies in the same package or the ports of two independent chip packages in the same board may be used for transmission to the external device. Another technique is dynamically adding and removing paths for data packets between devices with multiple ports based on the quality of the path.

FIG. 1A shows an example chip 100 that is subdivided into four identical dies 102, 104, 106, and 108. Each of the dies 102, 104, 106, and 108 include multiple processor cores, support circuits, serial interconnections and serial data control subsystems. For example, the dies 102, 104, 106, and 108 may each have 4,096 processing cores as well as SERDES interconnection lanes to support different communication protocols. There are die to die parallel connections between the dies 102, 104, 106 and 108. Thus, each of the dies 102, 104, 106, and 108 in this example are interconnected by Interlaken connections. The chip 100 is designed to allow one, two or all four of the dies 102, 104, 106, and 108 to be used. The pins on a package related to un-used dies are left unconnected in the package or the board. The dies are scalable as additional chips identical to the chip 100 may be implemented in a device or a circuit board. In this example, a single communication port such as an Ethernet port is provided for the chip 100. Of course, other ports may be provided, such as one or more ports for each die.

Figure 1B:
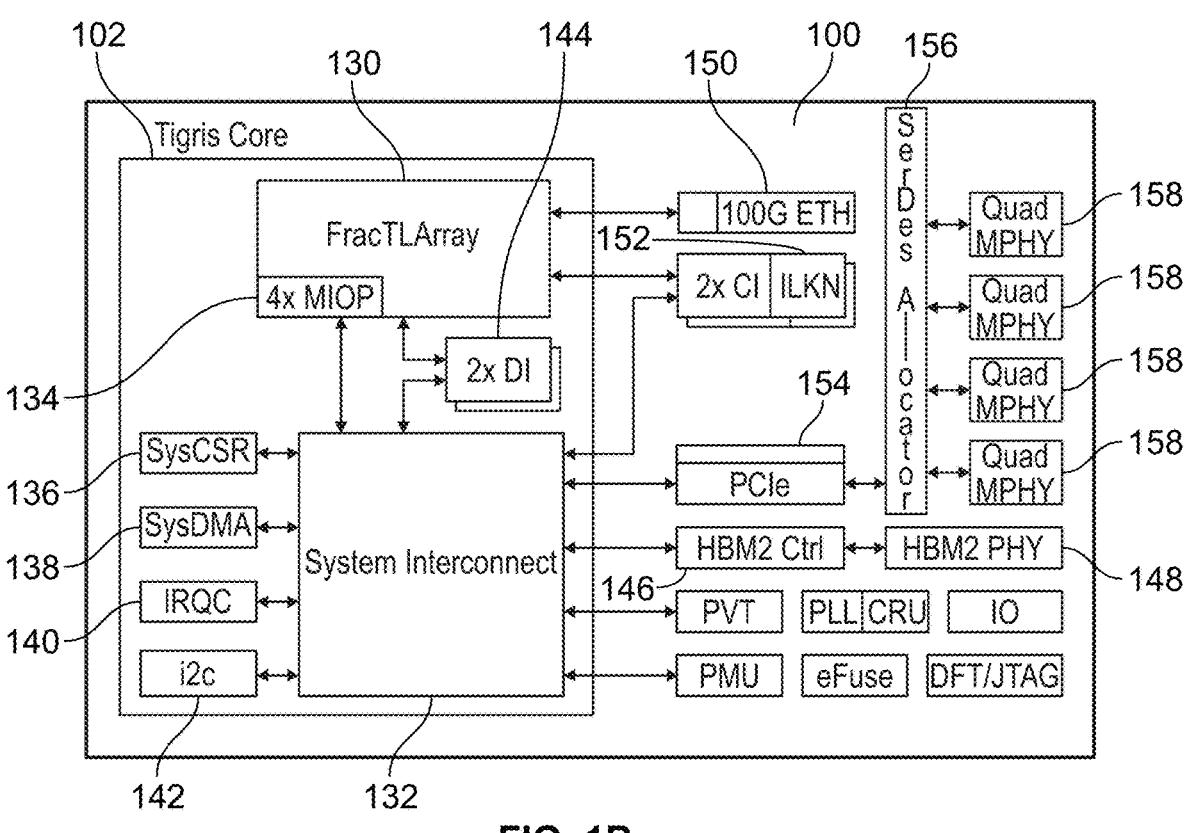
FIG. 1B is a simplified diagram of one of the dies on the chip shown in FIG. 1A.

FIG. 1B is a block diagram of one example of the die 102. The die 102 includes a fractal array 130 of processing cores. The processing cores in the fractal array 130 are interconnected with each other via a system interconnect 132. The entire array 130 serves as the major processing engine of the die 102 and the chip 100. In this example, there are 4,096 cores in the array 130 that are organized in a grid.

The system interconnection 132 is coupled to a series of memory input/output processors (MIOP) 134. The system interconnection 132 is coupled to a control status register (CSR) 136, a direct memory access (DMA) 138, an interrupt controller (IRQC) 140, an I2C bus controller 142, and two die to die interconnections 144. The two die to die interconnections 144 allow communication between the array of processing cores 130 of the die 102 and the two neighboring dies 104 and 108 in FIG. 1A.

The chip includes a high bandwidth memory controller 146 coupled to a high bandwidth interface 148 that constitutes a connection to an external memory sub-system such as a high bandwidth memory. The chip also includes an Ethernet controller system 150, an Interlaken controller system 152, and a PCIe controller system 154 for external communications. In this example each of the controller systems 150, 152, and 154 have a media access controller, a physical coding sublayer (PCS) and an input for data to and from the cores. Each controller of the respective communication protocol systems 150, 152, and 154 interfaces with the cores 130 to provide data in the respective communication protocol. In this example, the Interlaken controller system 152 has two Interlaken controllers and respective channels. A SERDES allocator 156 allows allocation of SERDES lines through quad M-PHY interface units 158 to the communication systems 150, 152 and 154. Each of the controllers of the communication systems 150, 152, and 154 may access the high bandwidth memory via the high bandwidth memory interface 148.

In this example, the array 130 of directly interconnected cores are organized in tiles with 16 cores in each tile. The array 130 functions as a memory network on chip by having a high-bandwidth interconnect for routing data streams between the cores and the external DRAM through memory IO processors (MIOP) 134 and the high bandwidth memory controller 146. The array 130 functions as a link network on chip interconnection for supporting communication between distant cores including chip-to-chip communication through an "Array of Chips" Bridge module. The array 130 has an error reporter function that captures and filters fatal error messages from all components of array 130.

Figure 2:
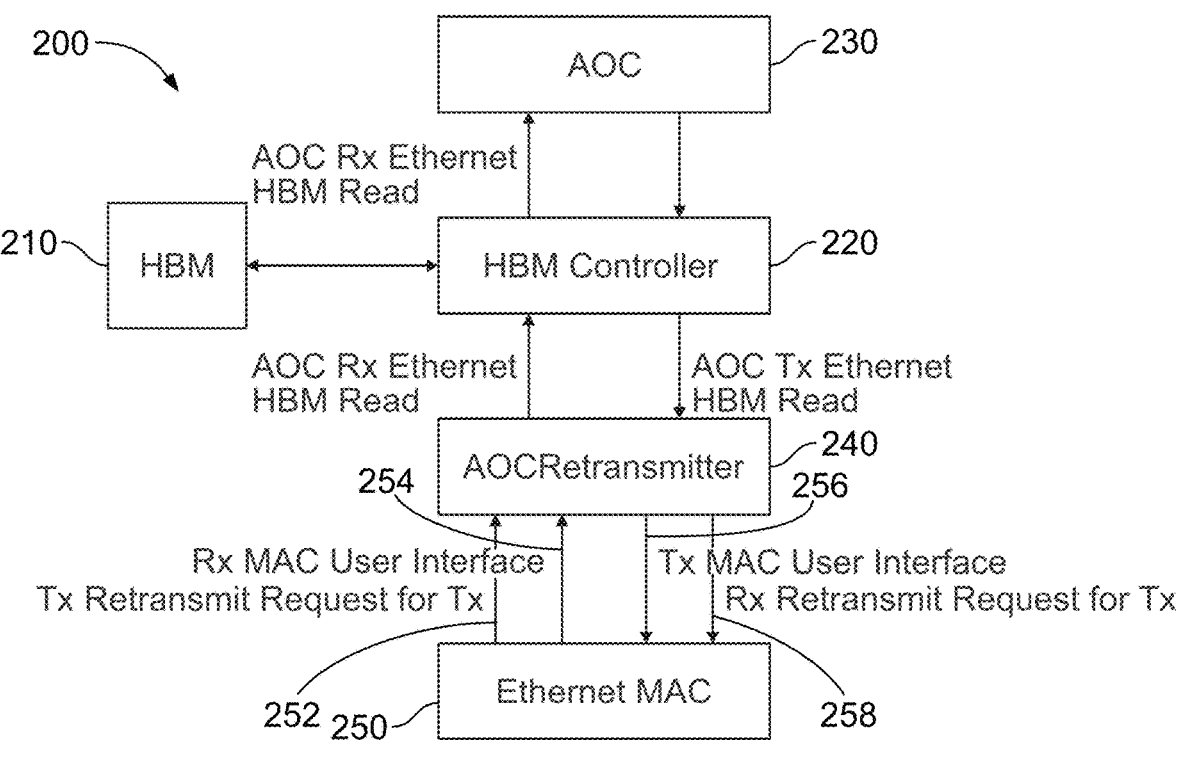
FIG. 2 is a block diagram of an example process of using high bandwidth memory (HBM) as a retransmit buffer for communications with large return transit time.

A first technique to insure reliability of data transmission between components on each of the dies uses an external high bandwidth memory (HBM) memory device through an interface such as the HBM interface 148 in FIG. 2B as a retransmit buffer for large RTT streams of data. FIG. 2 shows an example communication system 200 that allows the use of an HBM device as retransmit buffer. The communication subsystem 200 may incorporate a communication controller such as that on the Ethernet protocol subsystem 150, a memory controller such as the high bandwidth memory controller 146 on one of the dies of the chip 100 in FIG. 1A-1B in communication with a high bandwidth memory to allow robust communication between the array of cores and an external device.

The subsystem 200 includes a high bandwidth memory (HBM) device 210, an HBM controller 220, an array of cores (AOC) 230, a retransmitter 240 accessible by the cores in an array of cores (AOC) 230 and an Ethernet media access controller (MAC) 250. The data interchange from the array of cores 230 and external devices is managed by the Ethernet MAC 250. The Ethernet MAC 250 may send either a transmitted packet retransmit request 252 for outbound data or a receive data signal 254 for data transmitted from the external device, to the AOC retransmitter 240. The retransmitter 240 may send either a transmit data signal 256 for data to the external device or a received packet retransmit request 258 for the external device, to the Ethernet MAC 250.

The HBM controller 220 divides the data from the array of cores 230 into packets for transmission. The HBM controller 220 may send an Ethernet high bandwidth memory read request to the array of cores 230 for received data packets stored in the high bandwidth memory device 210. The retransmitter 240 may send an Ethernet high bandwidth memory write request to the HBM controller 220 for inbound data packets to be written into the high bandwidth memory device 210. The HBM controller 220 may send a transmit Ethernet read request to the retransmitter 240 for outbound packets stored in the HBM 210 that must be retransmitted.

The transmitted data from the array of cores 230 through the Ethernet port is stored in the high bandwidth memory 210 by the HBM controller 220. The transmitted data is read and packetized with sequence numbers by the HBM controller 220. The transmitted data packets are then sent through the Ethernet MAC 250 to the destination external device. The destination device sends a return acknowledgment signal indicating the status of the transmitted packet. When a negative acknowledgement is received for a packet from the Ethernet MAC 250 indicating an error, the acknowledgment signal includes the specific sequence number of the packet. The data packet matching the sequence number is read from the HBM 210 again by the HBM controller 220 via a read request from the retransmitter 240. The data packet is thus read from the HBM 210 and retransmitted through the Ethernet MAC 250. When a data packet has been confirmed to be received by the remote destination by a positive acknowledgement signal, it is erased from the HBM 210 and thus the memory space in the HBM 210 is freed up for new packets of transmitted data. Although, the above is used for Ethernet protocols that have a high round trip time, such as 25 GHZ, 50 GHz, and 10 GHz Ethernet, any communication protocol that uses packets may employ the described principles herein.

The HBM 210 may also be used as a retransmission buffer for received data from the external device. For example, when data packets are received through the Ethernet MAC 250, a write request is made from the retransmitter 240 to write the received packets in the high bandwidth memory 210. When the packets are received, the packets are sent to the array of cores 230 from the high bandwidth memory 210 by the HBM controller 220. If a packet in the sequence is not received, a retransmission request is made from the retransmitter 240 to the external device. Subsequent packets that are received are stored in the HBM 210. Thus, the HBM 210 is used as a buffer until the missing packet is received and the packets can then be sent to the array of cores 230 in sequence. The stored packets are then erased from the HBM 20.

Figure 3A:
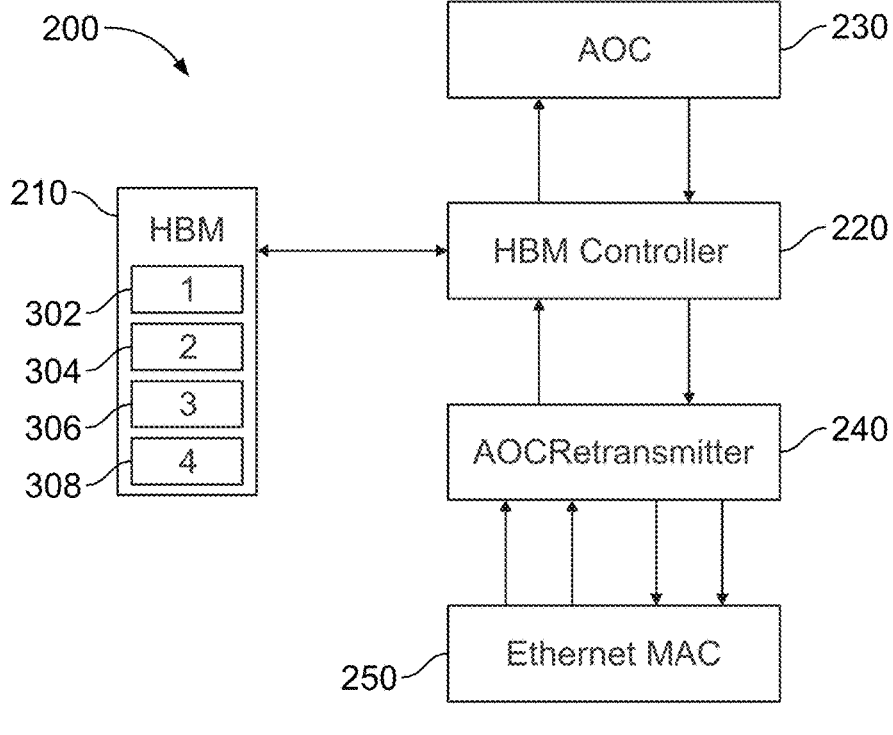
FIG. 3A-3D are block diagrams of the system in FIG. 2 that show the use of the HBM memory as a retransmit buffer.

FIG. 3A-3D show a sequence of packets that are transmitted through the Ethernet MAC 250 using the HBM 210 as a buffer for retransmission. FIG. 3A shows a series of four packets 302, 304, 306, and 308 that have been assigned sequence numbers 1-4. The packets 302, 304, 306, and 308 are stored in the HBM 210 before they are each transmitted through the Ethernet MAC 250 to a destination node.

Figure 3B:
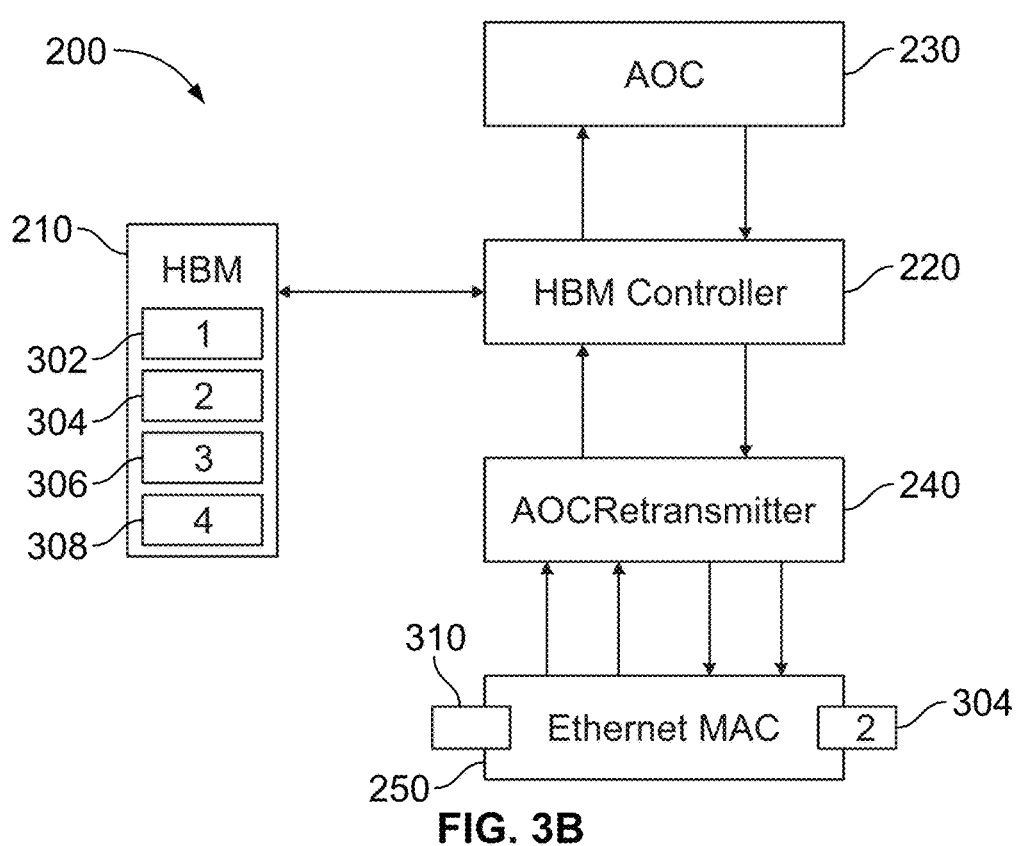

In FIG. 3B, a negative acknowledgement signal 310 is received by the AOC 230 indicating the failure to successfully receive the packet 304. The controller 220 accesses the HBM 210 via a read request and retransmits the packet 304 stored in the HBM 210 through the retransmitter 240 and the Ethernet MAC 250.

Figure 3C:
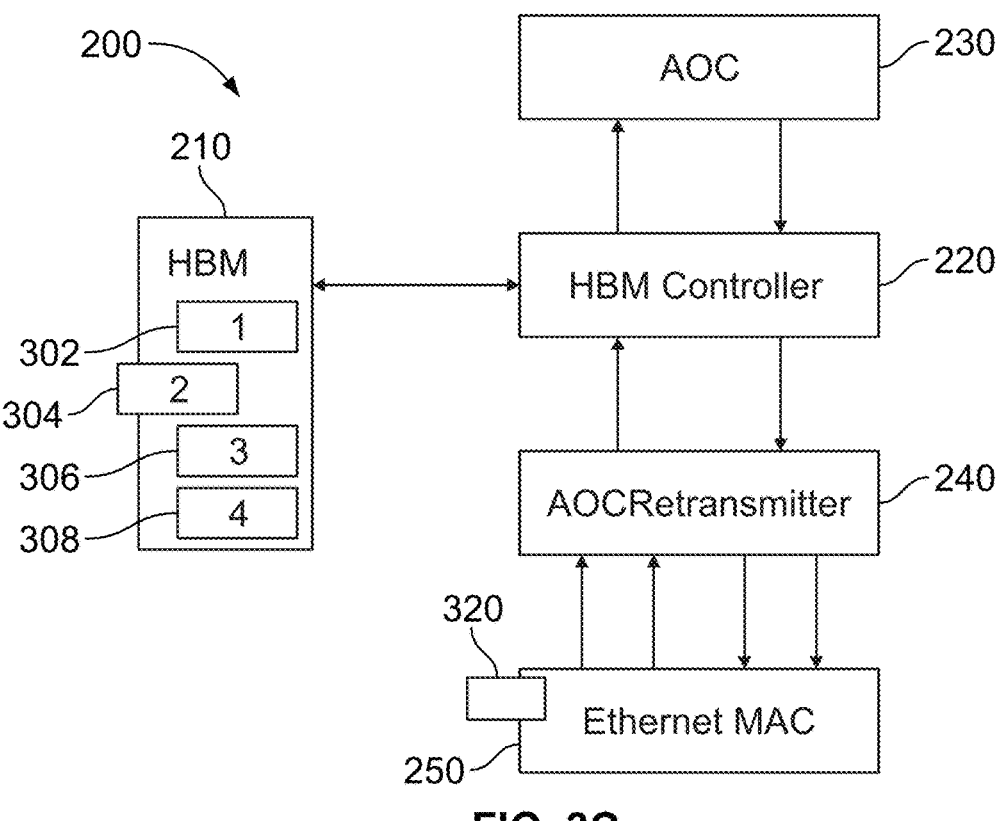
Figure 3D:
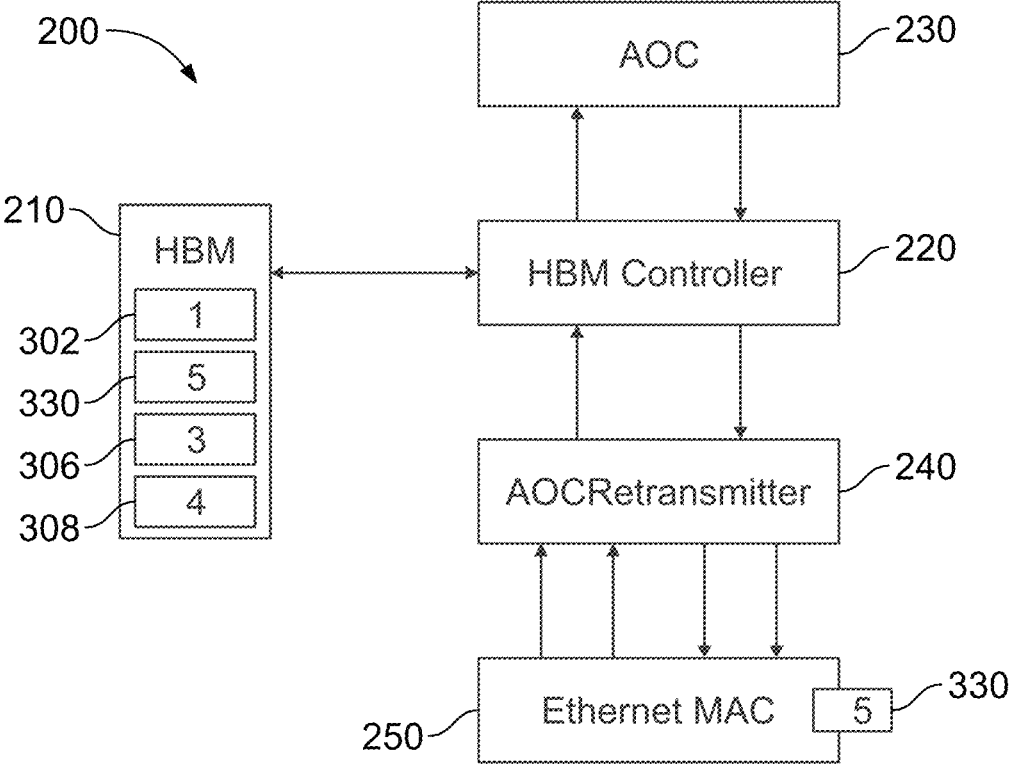

FIG. 3C shows the receipt of a received signal 320 from the destination node indicating successful receipt of the packet 304. In response, the HBM controller 220 erases the packet 304 from the HBM 210 as shown in FIG. 3D. The HBM controller 220 may then store a new packet 330 having sequence number 5 in the now unused space in the HBM 210 as shown in FIG. 3D. The packet 330 is sent through the Ethernet MAC 250 to the destination node.

Figure 4A:
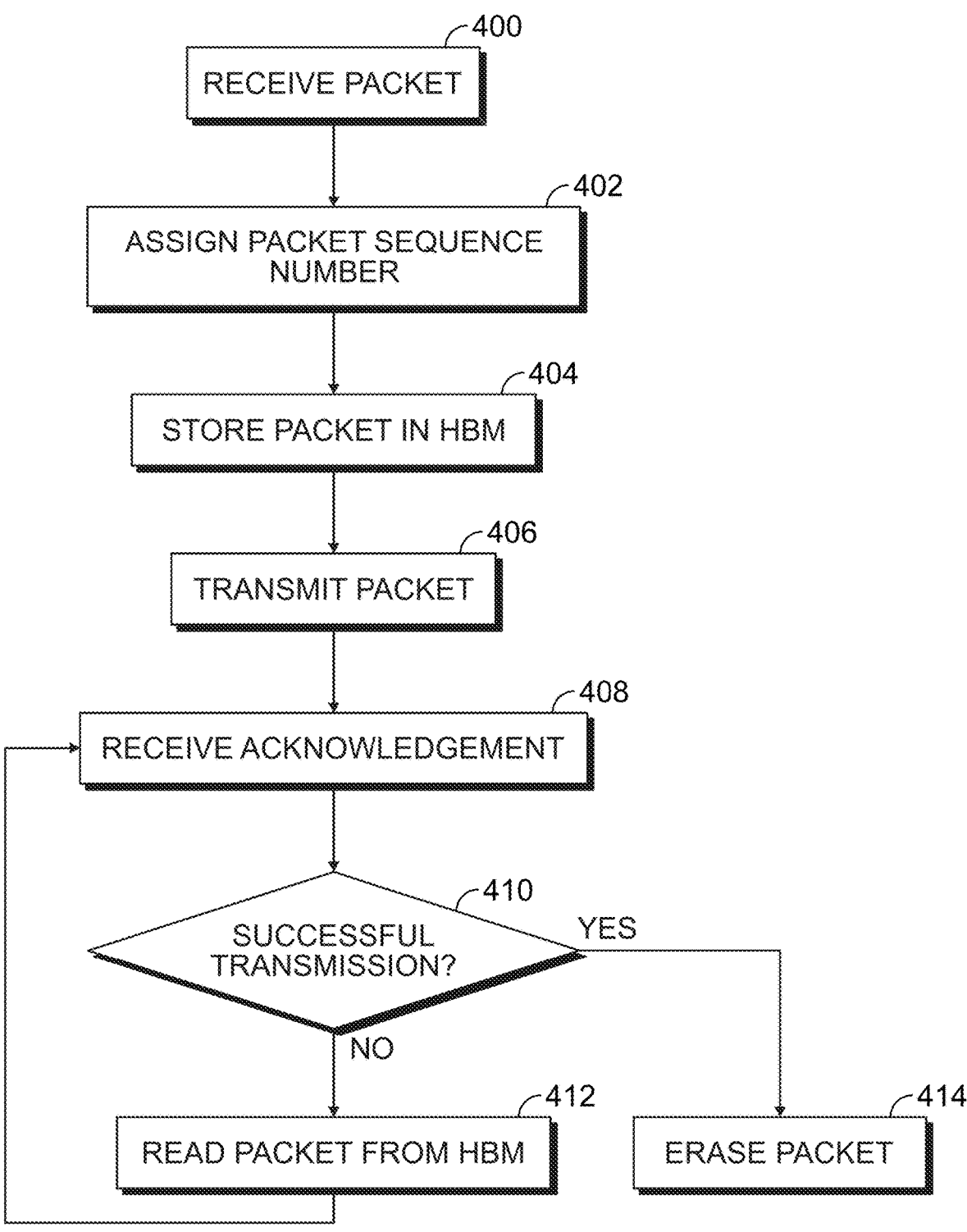
FIG. 4A is a flow diagram of the example process of using the HBM in FIG. 2 for transmitting packets from the array of cores.

FIG. 4A is a flow diagram of the routine executed by the HBM controller 220 to use the HBM 210 as a retransmit buffer. Data is received and divided into packets (400). The HBM controller 220 assigns a packet sequence number to each packet (402). The packet is stored in the HBM 210 (404). The packet is then transmitted through the Ethernet MAC 250 (406). An acknowledgement signal is received by the Ethernet MAC 250 (408). The retransmitter 240 reads the acknowledgement signal and determines if transmission of the packet was successful (410). If transmission was not successful, the packet sequence number is read from the acknowledgment signal and the packet is read from the HBM 210 (412). The packet is then transmitted against through the Ethernet MAC 250 (414). If the acknowledgement signal indicates a successful transmission (410), the packet sequence number is read and the corresponding packet is erased from the HBM 210 (414).

Figure 4B:
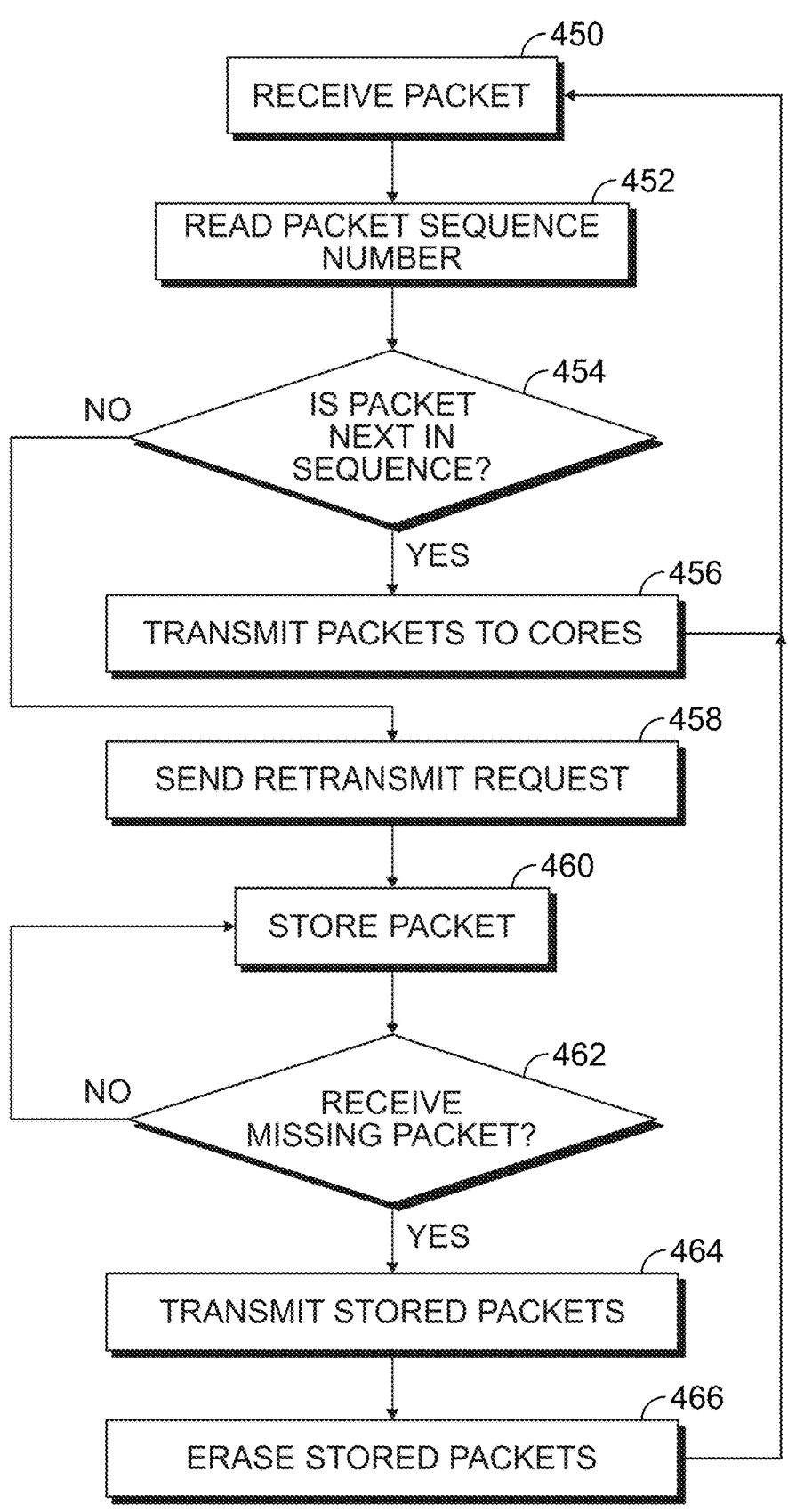
FIG. 4B is a flow diagram of the example process of using the HBM in FIG. 2 for receiving packets from an external device.

FIG. 4B is a flow diagram of the routine executed by the HBM controller 220 to use the HBM 210 as a receive buffer. A data packet is received from the Ethernet MAC 250 (450). The HBM controller 220 reads a packet sequence number from the received packet (452). The HBM controller 220 determines whether the packet is the next packet in sequence (454). If the packet is next packet in sequence, the HBM controller 220 transmits the received packets to the array of cores 230 (456). If the received packet is not the next packet in sequence, the HBM controller 220 causes the retransmitter 240 to send a retransmit request to the external device for the missing packet (458). The received packet is stored in the HBM 210 by the HBM controller 220 (460). The HBM controller 220 then receives subsequent packets and determines whether the missing packet is received (462). If the missing packet is not received, the HBM controller stores the received packet in HBM 210 (460). If the missing packet is received (462), the HBM controller 220 transmits the stored packets in the HBM 210 to the array of cores (464). The HBM controller 220 then erases the packets stored in the HBM 210 (466) and returns to receive further packets (452)

Other techniques for robust streaming may be used with dual ports such as two ports each with a communication subsystem. The physical hardware of such devices may vary, with multiple ports available.

Figure 5:
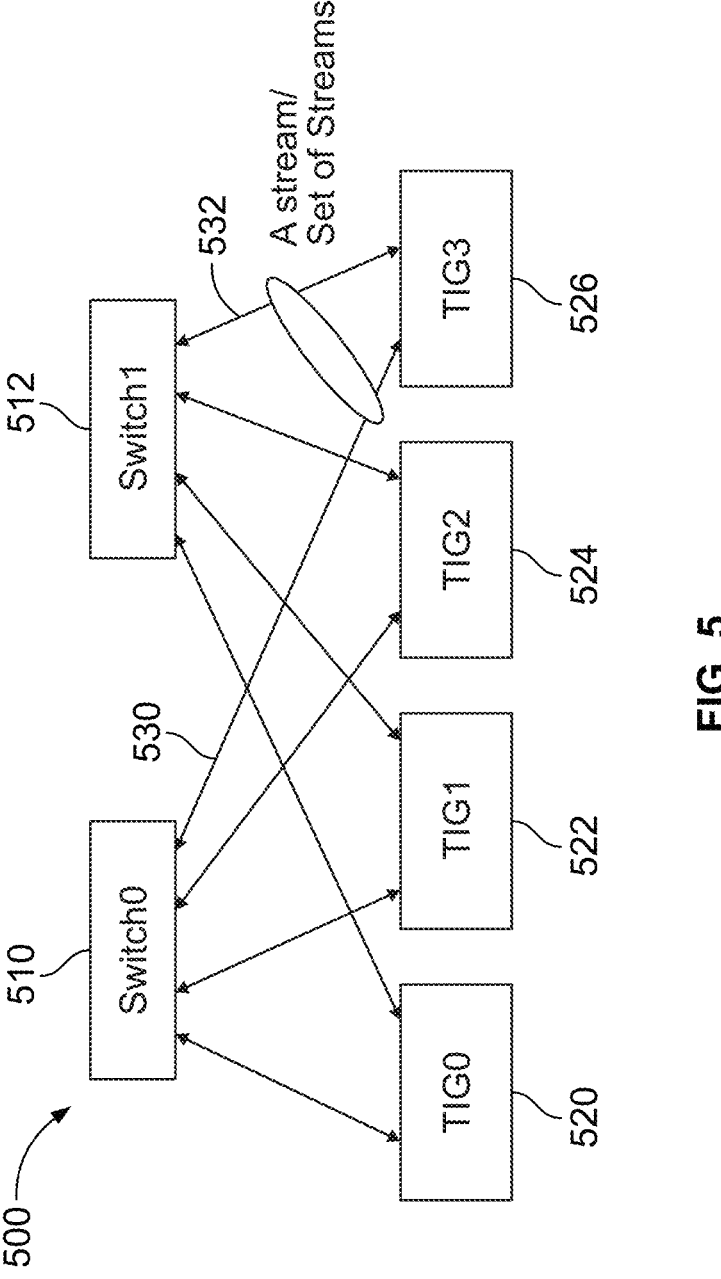
FIG. 5 is an example system that include multiple links to switches for multi-port chips that are operable to reroute traffic over the multiple links.

FIG. 5 shows a system 500 that includes two switches 510 and 512 that each are coupled to ports from four chips 520, 522, 524, and 526. FIG. 5 shows the technique of multiport Ethernet supporting single and multiple streams through two or more ports from different chips in the system 500. In this example, each of the chips 520, 522, 524, and 526 are similar to the chip 100 described in FIG. 1 with an array of cores. It is to be understood that more than two switches may be used. Each of the chips 520, 522, 524, and 526 in this example have two Ethernet ports, but may have more than two ports.

One example robust streaming technique distributes the data bound to an external destination node equally across multiple ports of each of the chips 520, 522, 524, and 526. On a path failure, all the packets will be steered to a subset of the available paths. The failing path is learned by the silicon devices (retransmitter logic) on one or more of the chips 520, 522, 524, and 526. When the number of failures is over a threshold level, that path will be marked not available for traffic. A background connectivity check message is used to check whether the failed path has recovered after the path is marked. If the path has recovered, the logic will add the path back to the list of paths available for the packets for that destination.

For example, the ports of the chip 526 are connected to the switch 510 and 512 by respective connections 530 and 532. If a failure is experienced by the retransmitter of the chip 526 that packets are not being successfully sent on the connection 532, the retransmitter will mark the path as unavailable. Further traffic will be sent only through the connection 530 to the switch 510. The retransmitter on the chip 526 may then check whether the connection 532 has recovered.

Further example techniques may employ hardware with multiple ports to ensure robust transmission. One such technique is to split a stream in round robin fashion between available ports. In this technique, the packets are sent with sequence numbers in the two or more ports, and based on sequence numbers, the packets are reordered on receipt. Another technique is to send the same packets over multiple ports. These techniques can completely avoid the retransmission logic on a chip or reduce the retransmission frequency.

Figure 6A:
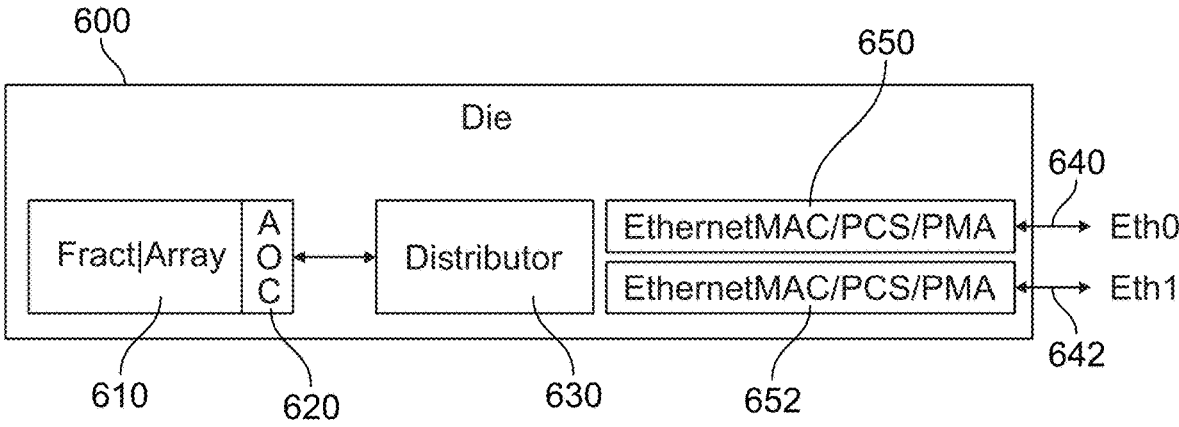
FIG. 6A is a block diagram of a die having multiple ports operable for different robust streaming techniques.
Figure 6B:
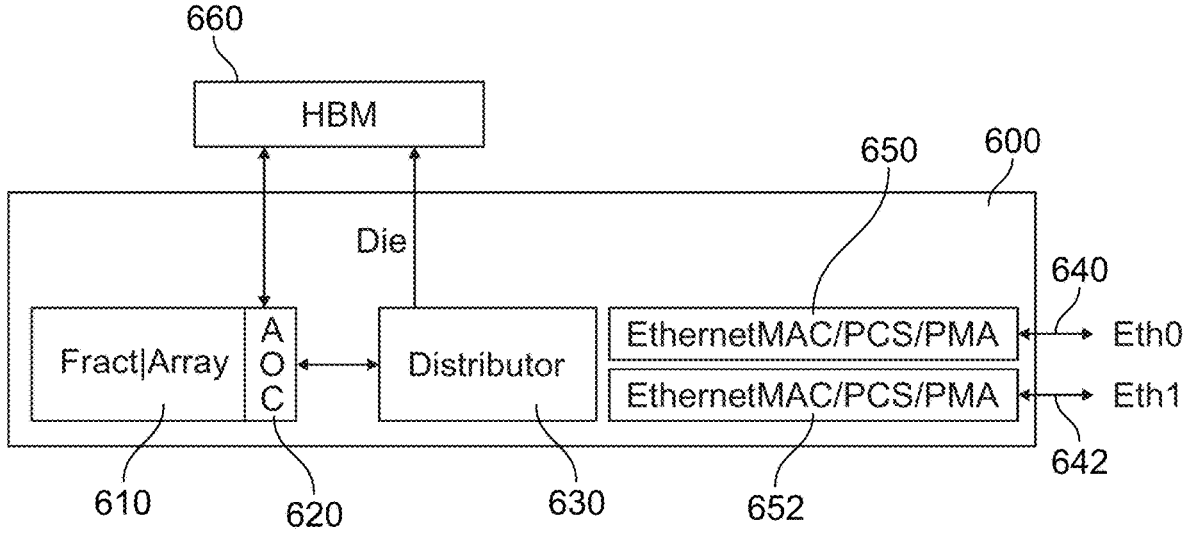
FIG. 6B is a block diagram of a die coupled to a high bandwidth memory that is operable for different robust streaming techniques.

Other examples of hardware that may employ the techniques described herein are shown in FIGS. 6A-6B. Certain hardware with access to a high bandwidth memory may combine the retransmitter buffer technique with the two port techniques. Of course, chips or dies with a single port with the high bandwidth memory may employ the high bandwidth memory as a retransmit buffer as described above. Hardware with only two ports without access to high bandwidth memory may employ the techniques using two ports.

FIG. 6A shows a die 600 that includes a fractal array of cores 610. The cores 610 have access to a communication interface 620 that allows data from any of the cores in the array of cores 610 to be transmitted to external devices. The interface 620 includes logic that creates a stream of data from the cores 610 and receives streams of data from external devices. In this example, the interface 620 is coupled to a distributor circuit 630. The distributor circuit 630 is a controller that may distribute the data in the received data stream according to the techniques described above to increase robust of data streams to and from the die 600. The die 600 in this example has two data communication ports 640 and 642. In this example, the ports 640 and 642 are Ethernet ports that require four lanes of serial communication.

Each of the ports 640 and 642 is coupled to a corresponding communication subsystem 650 and 652. The communication subsystems 650 and 652 in this example include an Ethernet media access controller (MAC), a protocol code sublayer (PCS) and a physical medium attachment (PMA)

sublayer. Thus, the distributor circuit 630 is operable to distribute packets of an outgoing data stream between the ports 640 and 642. Alternatively, the distributor circuit 630 may send the same packet of a stream to be transmitted by both ports 640 and 642.

FIG. 6B shows the die 600 with additional communication to a high bandwidth memory device 660. The die 600 may therefore employ the robustness techniques using the two ports 640 and 642. The retransmitter 620 may also use the HBM 660 as a retransmitter buffer for pending outgoing packets thus assigning sequence numbers to outgoing packets. Unsuccessfully transmitted packets may be retransmitted from the HBM 660 as explained above.

Figures 7, 8:
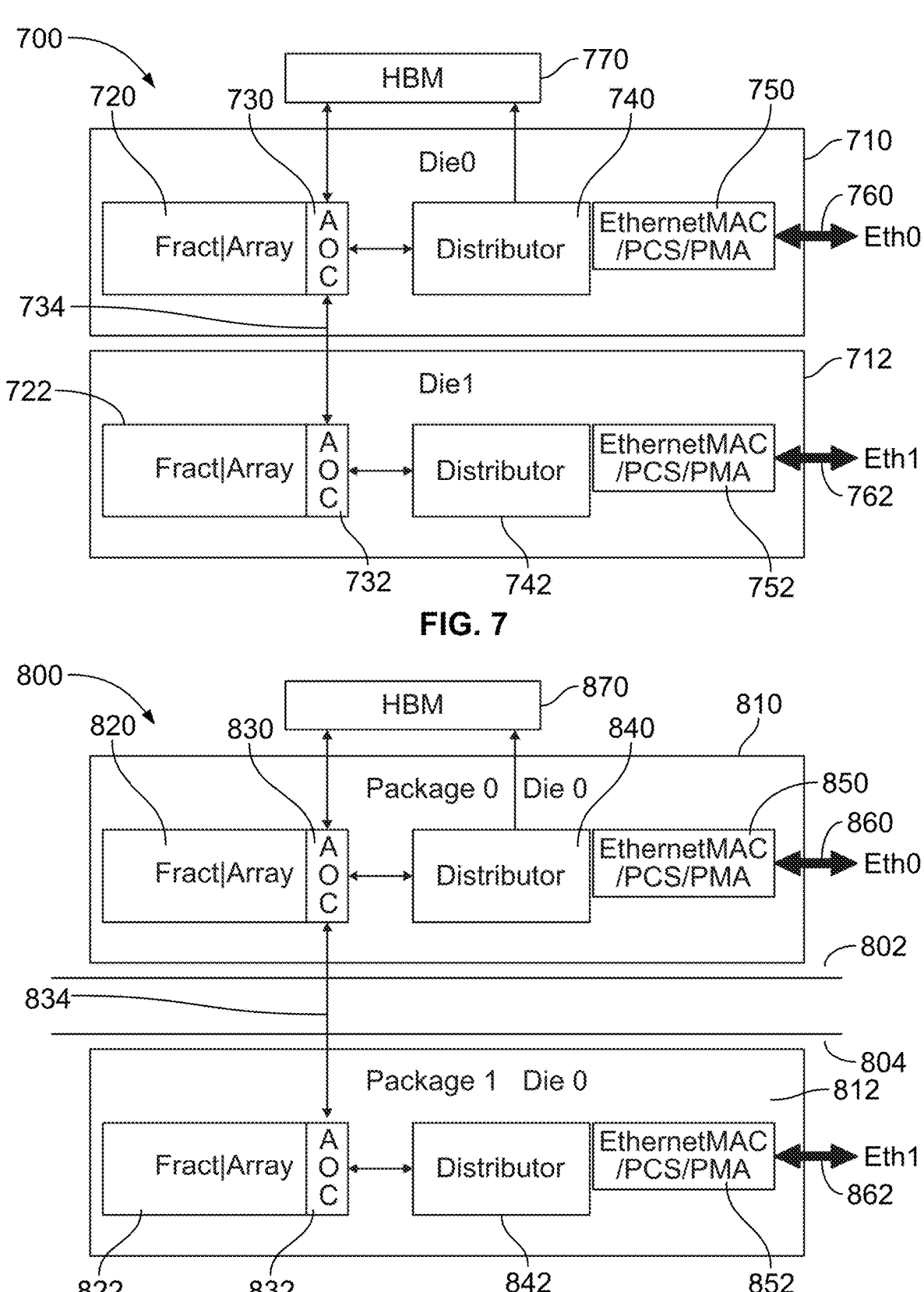
FIG. 7 is a block diagram of an example two die system operable for different robust streaming techniques.
FIG. 8 is a block diagram of an example two chip system operable for different robust streaming techniques.

FIG. 7 shows a device 700 that uses two multi-core dies 710 and 712. Each of the dies 710 and 712 have a single communication port. In this example, since the dies 710 and 712 are formed on the same chip, a high speed communication interface allows the cores on each die 710 or 712 to communicate with each other.

In this example, the die 710 includes a fractal array of cores 720. Similarly, the die 712 includes a fractal array of cores 722. The cores 720 of the die 710 have access to an interface 730 that allows data from any of the cores in the array of cores 710 to be transmitted to external devices. The cores 722 of the die 712 have access to an interface 732 that allows data from any of the cores in the array of cores 720 to be transmitted to external devices. The interface 730 includes logic that creates a stream of data from the cores 720 and receives streams of data from external devices. Similarly, the interface 732 includes logic that creates a stream of data from the array of cores 722 and receives streams of data from external devices. The interface 730 and the interface 732 are coupled together by an internal communication interface 734 that allows the high speed exchange of data between the cores 720 on the die 710 and the cores 722 of the die 712. In this example, the communication interface is a high speed Interlaken connection, but other interfaces may be used.

In this example, the interface 730 is coupled to a distributor circuit 740 on the die 710. The distributor circuit 740 is coupled to a communication subsystem 750 that transmits and receives data from a port 760 on the die 710. The interface 732 on die the 712 is coupled to a distributor circuit 742. The distributor circuit 742 is coupled to a communication subsystem 752 that transmits and receives data from a port 762. In this example, the ports 760 and 762 are Ethernet ports that require four lanes of serial communication. The communication subsystems 750 and 752 in this example include an Ethernet media access controller (MAC), a protocol code sublayer (PCS), and a physical medium attachment (PMA) sublayer.

The distributor circuit 740 may distribute the data in the received data streams from either array of cores 720 of the die 710 or the array of cores 722 of the die 712 to the ports 760 and 762 according to the techniques described above to increase robust of data streams to and from the system 700. In this example, the distributor circuit 740 relies on the high speed interconnection 734 to route data between the dies 710 and 712 and the respective ports 760 and 762. Similarly, the distributor circuit 742 is a controller that may distribute the data in the received data streams from either array of cores 720 of the die 710 or the array of cores 722 of the die 712 to the ports 760 and 762 according to the techniques described above to increase robust of data streams to and from the system 700.

The system 700 also includes a high bandwidth memory device 770. The distributors 740 and 742 may therefore use the HBM 770 as a retransmitter buffer for pending outgoing packets from cores on either die 710 or 712 thus assigning sequence numbers to outgoing packets. Unsuccessfully transmitted packets may be retransmitted from the HBM 770 as explained above.

FIG. 8 shows a device 800 that includes two chips 802 and 804. Each of the chips 802 and 804 in this example are similar to the chip 100 shown in FIG. 1A. Thus, each of the chips 802 and 804 have multiple multi-core dies such as a die 810 on the chip 802 and a die 812 on the chip 804. Each of the dies 810 and 812 have access to a single communication port on the respective chips 802 and 804. In this example, a high speed communication interface allows the cores on each die of the chips 802 and 804 to communicate with each other.

In this example, the die 810 includes a fractal array of cores 820. Similarly, the die 812 includes a fractal array of cores 822. The cores 820 of the die 810 have access to a communication interface 830 that allows data from any of the cores in the array of cores 810 to be transmitted to external devices. The cores 822 of the die 812 have access to a communication interface 832 that allows data from any of the cores in the array of cores 820 to be transmitted to external devices. The interface 830 includes logic that creates a stream of data from the cores 820 and receives streams of data from external devices. Similarly, the interface 832 includes logic that creates a stream of data from the array of cores 822 and receives streams of data from external devices. The interface 830 and the interface 832 are coupled together by an internal communication interface 834 that allows the high speed exchange of data between the cores 820 on the die 810 and the cores 822 of the die 812. In this example, the communication interface 834 is a high speed Interlaken connection, but other interfaces may be used. Other dies on the chip 802 may also have interfaces that communicate with the interface 830 to allow their respective cores to communicate with the cores 820. Similarly, other dies on the chip 804 may also have interfaces that communicate with the interface 832 to allow their respective cores to communicate with the cores 822.

In this example, the interface 830 is coupled to a distributor circuit 840 on the die 802. The distributor circuit 840 is coupled to a communication subsystem 850 that transmits and receives data from a port 860 on the die 810. The die 812 also has a distributor circuit 842 coupled to a communication subsystem 852 that transmits and receives data from a port 862. In this example, the ports 860 and 862 are Ethernet ports that require four lanes of serial communication. The communication subsystems 850 and 852 in this example include an Ethernet media access controller (MAC), a protocol code sublayer (PCS) and a physical medium attachment (PMA) sublayer.

The distributor circuit 840 is a controller that may distribute the data in the received data streams from either array of cores 820 of the die 810 or the array of cores 822 of the die 812 to the ports 860 and 862 according to the techniques described above to increase robust of data streams to and from the system 800. Similarly, the distributor circuit 842 is a controller that may distribute the data in the received data streams from either array of cores 820 of the die 810 or the array of cores 822 of the die 812 to the ports 860 and 862 according to the techniques described above to increase robust of data streams to and from the system 800. In this example, the distributor 840 relies on the high speed interconnection 834 to route data between the dies 810 and 812 and the respective ports 860 and 862.

The system 800 also includes a high bandwidth memory device 870. The distributor 840 may therefore use the HBM 870 as a retransmitter buffer for pending outgoing packets from cores on either die 810 or 812 thus assigning sequence numbers to outgoing packets. Unsuccessfully transmitted packets may be retransmitted from the HBM 870 as explained above.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations, and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A die comprising:
a plurality of processing cores;
an external memory interface in communication with an external memory device;
a first port;
a high speed interconnection with another die with a plurality of processing cores and a second port;
an interface logic for receiving data from the plurality of processing cores, the interface logic coupled to the high speed interconnection; the interface logic communicating to an external device via the first port or the second port;
a distribution controller operable to:
divide a data stream from at least one of the plurality of processing cores into data packets;
assign a sequence number to each of the data packets;
store a copy of each of the data packets in the external memory device;
send the data packets to the external device through a communication media access controller via allocating each of the data packets to either be sent through the first port or sent through the interface logic and high speed interconnection to the second port;
receive a signal indicating that a data packet has not been successfully received by the external device; and
retransmit the data packet from the external memory device.

2. The die of claim 1, further comprising a third port, wherein each of the data packets are allocated to one of the first port, second port or third port by the distribution controller.

3. The die of claim 1, wherein the first port is an Ethernet port.

4. The die of claim 1, further comprising retransmitter logic operable to determine failure on the first or second port and marking the determined port as not available for traffic.

5. The die of claim 4, wherein the data packets are rerouted to the first or second port that is not marked as not available for traffic.

6. The die of claim 5, wherein the retransmitter logic is operable to:
send a background connectivity message on the first or second port that is marked as not available for traffic;
determine whether the first or second port marked as not available for traffic has recovered; and
wherein the distribution controller reroutes the data packets to either the first or second port when a determination that the first or second port has recovered.

7. The die of claim 4, wherein the retransmitter logic determines failure of the first or second port by counting failures on each port and comparing the number of failures to a threshold value.

8. The die of claim 1, wherein the high speed interconnection is an Interlaken connection.

9. The die of claim 1, wherein the distribution controller is operable to allocate at least one the data packets to be sent through the first port and allocate at least another one of the data packets to be sent to the second port through interface logic and high speed interconnection.

10. A processing system comprising:
a first die including:
at least one processing core;
a first port;
a high speed interconnection; and
a first interface logic for receiving data from the at least one processing core, the first interface logic coupled to the first port; and
a second die including:
at least one processing core coupled to the high speed interconnection;
a second port; and
a distribution controller on the first die coupled the first interface logic, the distribution controller operable to:
divide a data stream from the at least one processing core of the first die into data packets; and
send the data packets to an external device through a first communication media access controller via allocating each of the data packets to either be sent through the first port or sent through the interface logic and high speed interconnection to the second port.

11. The system of claim 10, further comprising a memory device, wherein the distribution controller is further operable to:
assign a sequence number to each of the data packets;
store a copy of each of the data packets in the memory device;

receive a signal indicating that a data packet has not been successfully received by the external device; and retransmit the data packet from the memory device.

12. The system of claim 10, wherein the first die includes a third port, wherein each of the data packets are allocated to one of the first port, second port or third port by the distribution controller.

13. The system of claim 10, wherein the first port is an Ethernet port.

14. The system of claim 10, further comprising retransmitter logic operable to determine failure on the first or second port and marking the determined port as not available for traffic.

15. The system of claim 10, wherein the data packets are rerouted to the first or second port that is not marked as not available for traffic.

16. The system of claim 15, wherein the retransmitter logic determines failure of the first or second port by counting failures on each port and comparing the number of failures to a threshold value.

17. The system of claim 16, wherein the retransmitter logic is operable to:

send a background connectivity message on the first or second port that is marked as not available for traffic;

determine whether the first or second port marked as not available for traffic has recovered; and wherein the distribution controller reroutes the data packets to either the first or second port when a determination that the first or second port has recovered.

18. The system of claim 10, wherein the high speed interconnection is an Interlaken connection.

19. The system of claim 10, further comprising a switch coupled to the first and second port, the switch coupled to the external device.

20. The system of claim 10, wherein the distribution controller is operable to allocate at least one the data packets to be sent through the first port and allocate at least another one of the data packets to be sent to the second port through the first interface logic and high speed interconnection.

* * * * *